(12) United States Patent
Hedrick

(10) Patent No.: US 7,699,974 B2
(45) Date of Patent: Apr. 20, 2010

(54) METHOD AND SYSTEM OF HEATING A FLUID CATALYTIC CRACKING UNIT HAVING A REGENERATOR AND A REACTOR

(75) Inventor: Brian W. Hedrick, Oregon, IL (US)

(73) Assignees: UOP LLC, Des Plaines, IL (US); BP Corporation North America Inc., Warrenville, IL (US)

( * ) Notice: Subject to any disclaimer, the term of this patent is extended or adjusted under 35 U.S.C. 154(b) by 237 days.

(21) Appl. No.: 11/962,740

(22) Filed: Dec. 21, 2007

(65) Prior Publication Data
US 2009/0158657 A1  Jun. 25, 2009

(51) Int. Cl.
*C10J 3/00* (2006.01)
(52) U.S. Cl. .......................... 208/113; 208/106; 60/269; 422/139; 422/187
(58) Field of Classification Search .................. 208/106, 208/113–124; 60/269
See application file for complete search history.

(56) References Cited

U.S. PATENT DOCUMENTS

| | | | |
|---|---|---|---|
| 2,888,395 A | 5/1959 | Henny | |
| 2,905,622 A | 9/1959 | McCarthy | |
| 3,137,133 A | 6/1964 | Wilson et al. | |
| 3,363,993 A | 1/1968 | Campbell | |
| 3,401,124 A | 9/1968 | Goulden | |
| 3,554,903 A | 1/1971 | Wilson | |
| 3,726,791 A | 4/1973 | Kimberlin et al. | |
| 3,856,659 A | 12/1974 | Owen | |
| 3,886,060 A | 5/1975 | Owen | |
| 3,928,172 A | 12/1975 | Davis, Jr. et al. | |
| 4,075,831 A | 2/1978 | McGann | |
| 4,158,680 A | 6/1979 | McGann | |
| 4,276,150 A | 6/1981 | McHenry, Jr. | |
| 4,316,794 A | 2/1982 | Schoennagel | |
| 4,338,788 A | 7/1982 | Fink | |
| 4,388,218 A | 6/1983 | Rowe | |
| 4,399,651 A | 8/1983 | Geary, Jr. et al. | |

(Continued)

FOREIGN PATENT DOCUMENTS

BE   875 477   10/1979

(Continued)

OTHER PUBLICATIONS

U.S. Appl. No. 11/643,497, filed Dec. 21, 2006, Towler et al.

(Continued)

*Primary Examiner*—Robert J Hill, Jr.
*Assistant Examiner*—Brian McCaig
(74) *Attorney, Agent, or Firm*—Brinks Hofer Gilson & Lione

(57) ABSTRACT

In at least one embodiment of the present invention, a method of heating a FCC unit having a regenerator and a reactor having overall $CO_2$ reduction is provided. The method comprises compressing syngas to define compressed syngas. Separating a first stream of gas comprising $CO_2$ from the compressed syngas. A second stream of gas comprising $O_2$ is expanded with the first stream of gas to produce a feed gas. The feed gas is introduced to the regenerator at gasification conditions to burn coke from coke heavy spent catalyst advanced from the reactor, producing syngas and heat for operating the reactor at reaction temperatures.

25 Claims, 4 Drawing Sheets

U.S. PATENT DOCUMENTS

| | | | |
|---|---|---|---|
| 4,422,925 | A | 12/1983 | Williams et al. |
| 4,425,259 | A | 1/1984 | Hettinger, Jr. et al. |
| 4,431,529 | A | 2/1984 | Carson |
| 4,452,048 | A | 6/1984 | Geary, Jr. et al. |
| 4,539,303 | A | 9/1985 | Maclean et al. |
| 4,542,114 | A * | 9/1985 | Hegarty ................ 502/39 |
| 4,600,499 | A | 7/1986 | Hettinger |
| 4,776,948 | A | 10/1988 | Skraba |
| 4,888,103 | A | 12/1989 | Herbst et al. |
| 4,927,348 | A | 5/1990 | Avidan |
| 4,965,232 | A | 10/1990 | Mauleon |
| 5,114,682 | A | 5/1992 | Goelzer |
| 5,451,313 | A | 9/1995 | Wegerer et al. |
| 5,538,623 | A | 7/1996 | Johnson et al. |
| 5,597,537 | A | 1/1997 | Wegerer et al. |
| 5,800,697 | A | 9/1998 | Lengemann |
| 6,048,451 | A | 4/2000 | Huff, Jr. et al. |
| 6,110,356 | A | 8/2000 | Hedrick et al. |
| 6,324,895 | B1 | 12/2001 | Chitnis et al. |
| 6,616,899 | B1 | 9/2003 | Upson |
| 6,866,771 | B2 | 3/2005 | Lomas et al. |
| 2004/0120878 | A1 | 6/2004 | Mayes, Jr. |
| 2006/0021909 | A1 | 2/2006 | Cerqueira |
| 2009/0032439 | A1 | 2/2009 | Couch et al. |
| 2009/0035191 | A1 | 2/2009 | Couch et al. |

FOREIGN PATENT DOCUMENTS

| | | |
|---|---|---|
| DE | 1 667 573 | 8/1967 |
| DE | 2021 787 | 11/1971 |
| DE | 36 35 269 A1 | 10/1985 |
| DE | 37 09 185 A1 | 3/1986 |
| EP | 0 083 462 | 7/1983 |
| EP | 0092065 | 10/1983 |
| EP | 0100531 | 2/1984 |
| EP | 0 113 380 A1 | 7/1984 |
| EP | 0 162 251 A1 | 11/1985 |
| EP | 0 322 274 A1 | 6/1989 |
| EP | 0 369 537 A1 | 5/1990 |
| EP | 0490453 | 6/1992 |
| EP | 0 629 685 A1 | 12/1994 |
| EP | 1 278 700 B1 | 1/2003 |
| EP | 1 935 966 A1 | 6/2008 |
| EP | 1 939 269 A1 | 7/2008 |
| EP | 2 022 838 A1 | 2/2009 |
| FR | 2 596 059 A1 | 9/1987 |
| FR | 2 796 932 | 2/2001 |
| GB | 711208 | 6/1954 |
| GB | 2 024 033 A | 1/1980 |
| GB | 2107205 | 4/1983 |
| GB | 2 197 390 A | 5/1988 |
| GB | 2 263 314 A | 7/1993 |
| JP | 59-52529 | 3/1984 |
| JP | 5-17162 | 2/1987 |
| JP | 62-32181 | 2/1987 |
| JP | 62-56919 | 3/1987 |
| JP | 5-320863 | 12/1993 |
| JP | 6-256239 | 9/1994 |
| WO | WO 85/04181 | 9/1985 |
| WO | WO 90/06352 | 6/1990 |
| WO | WO 96/39369 | 12/1996 |
| WO | WO 98/46700 | 10/1998 |
| WO | WO 99/11739 | 3/1999 |
| WO | WO 01/70909 A1 | 9/2001 |
| WO | WO 01/77010 A1 | 10/2001 |
| WO | WO 02/04347 A1 | 1/2002 |
| WO | WO 02/051966 A1 | 7/2002 |
| WO | WO 03/035591 A1 | 5/2003 |
| WO | WO 03/062142 A1 | 7/2003 |

OTHER PUBLICATIONS

U.S. Appl. No. 11/643,554, filed Dec. 21, 2006, Hedrick et al.
U.S. Appl. No. 11/643,733, filed Dec. 21, 2006, McGehee.
U.S. Appl. No. 11/643,734, filed Dec. 21, 2006, Towler et al.
U.S. Appl. No. 11/962,740, filed Dec. 21, 2007, Hedrick.
U.S. Appl. No. 11/962,763, filed Dec. 21, 2007, Hedrick.
U.S. Appl. No. 11/962,810, filed Dec. 21, 2007, Hedrick.
U.S. Appl. No. 11/963,006, filed Dec. 21, 2007, Towler.
U.S. Appl. No. 11/963,051, filed Dec. 21, 2007, Towler.
U.S. Appl. No. 11/963,101, filed Dec. 21, 2007, Hedrick.
J. Terrible, et al.; "Consider using hydrogen plants to cogenerate power needs"; Hydrocarbon Processing (International edition); vol. 78/No. 12; pp. 43-53; Dec. 1999.
D.W. Townsend, et al.; "Heat and Power Networks in Process Design—Criteria for Placement of Heat Engines and Heat Pumps in Process Networks"; AlChe Journal (vol. 29, No. 5); pp. 742-748; Sep. 1983.
D.L. Bonk, et al.: "An Evaluation of Gas Turbines for APFBC Power Plants"; Presented to the Powergen 2000 Conference.
D.L. Bonk, et al.; "First-Generation Circulating Pressurized Fluidized Bed (CPFB) Combustor Power System with Industrial Components"; U.S. Department of Energy (date unknown).
D.G. Tajbl: "UOP Fluid Catalytic Cracking Process"; Handbook of Petroleum Refining Process, R.A. Meyers, Ed.; New York: McGraw Hill 1986.
McCabe, W.L. et al. (1993) Unit Operations in Chemical Engineering, 5$^{th}$ ed., McGraw-Hill, (5 pages).

* cited by examiner

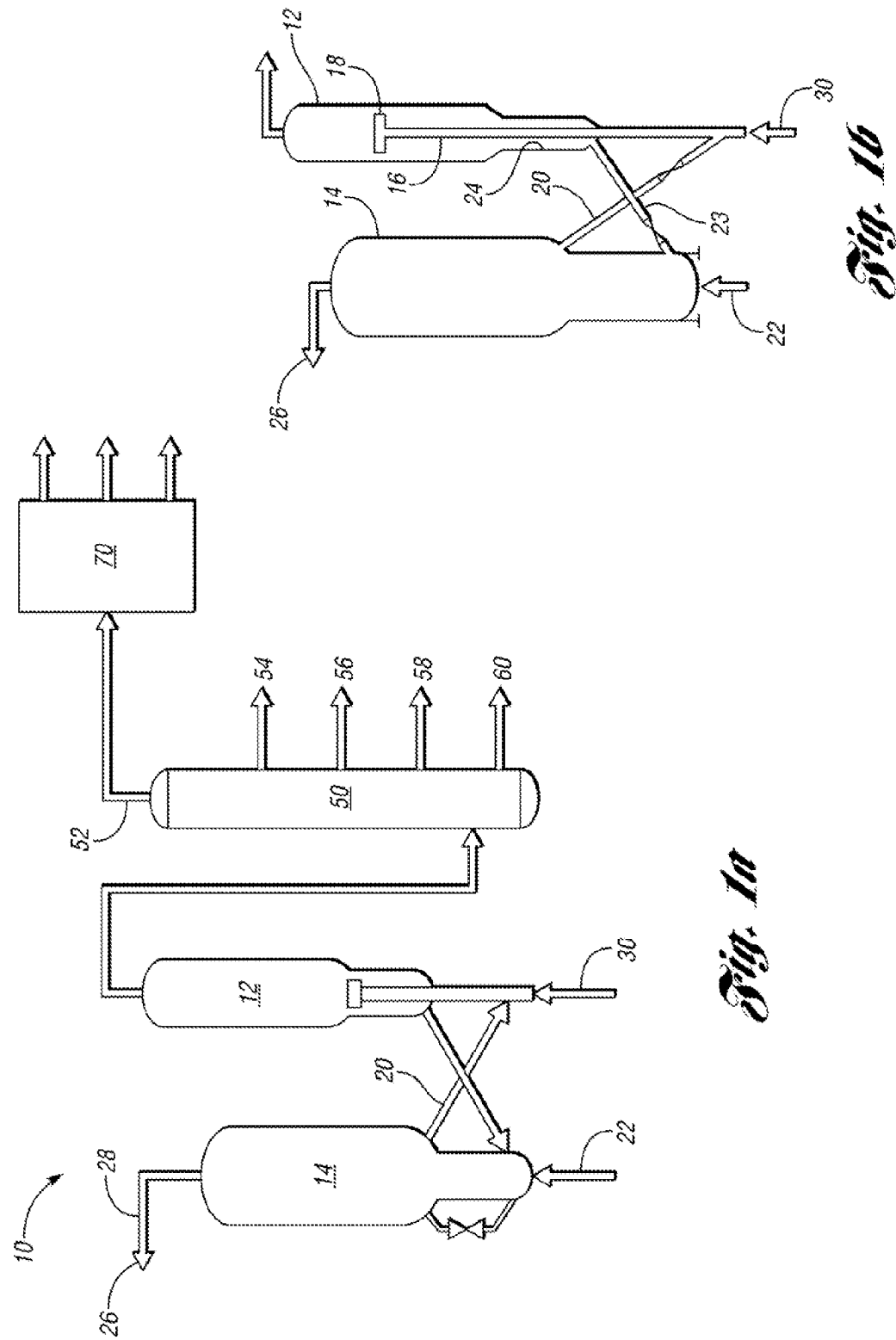

METHOD AND SYSTEM OF HEATING A FLUID CATALYTIC CRACKING UNIT HAVING A REGENERATOR AND A REACTOR

THE NAMES OF THE PARTIES TO A JOINT RESEARCH AGREEMENT

This application is the result of a joint research agreement between UOP LLC and BP Products North America Inc.

BACKGROUND OF THE INVENTION

The present invention relates to methods and systems of reducing carbon dioxide emissions in a fluid catalytic cracking unit.

The fluidized catalytic cracking of hydrocarbons is the mainstay process for the production of gasoline and light hydrocarbon products from heavy hydrocarbon charge stocks such as vacuum gas oils (VGO) or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking (FCC) of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium.

The FCC process is carried out by contacting the starting material—generally VGO, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. Thus, there is a need to provide a way to reduce the carbon dioxide emissions of a fluid catalytic cracking unit.

One solution to reducing carbon dioxide emissions involves operating the FCC regenerator at gasification conditions and supplying the regenerator with a feed comprising recycled carbon dioxide and oxygen. In this scenario, carbon dioxide is reduced in part because the carbon dioxide is being recycled from a synthesis gas separator unit. One issue with this solution, however, is that under gasification conditions, the regenerator may not supply enough heat to the FCC reactor for cracking the hydrocarbon feedstock with the catalyst.

BRIEF SUMMARY OF THE INVENTION

Embodiments of the present invention generally provide methods and systems of heating a fluid catalytic cracking unit having a reactor and a regenerator operating at gasification conditions for overall carbon dioxide reduction. The methods and systems of the present invention provide solutions to generating sufficient heat for operating the reactor at reaction temperature.

In at least one embodiment, a method of heating a fluid catalytic cracking unit having a regenerator and a reactor for overall carbon dioxide reduction is provided. The method comprises compressing syngas at an inlet pressure to a predetermined high pressure to define compressed syngas. The syngas comprises carbon dioxide ($CO_2$), carbon monoxide (CO), water ($H_2O$), hydrogen sulfide ($H_2S$) and carbonyl sulfide (COS). A first stream of gas comprising $CO_2$ is separated from the compressed syngas. The first stream of gas is expanded with a second stream of gas comprising oxygen ($O_2$) to a predetermined low pressure to define a feed gas. The feed gas is introduced to the regenerator at gasification conditions to burn coke from coke heavy spent catalyst advanced from the reactor. Burning of the coke produces the syngas and heat for operating the reactor at reaction temperatures.

In one aspect of the present invention, the method further comprises providing a turbo-expander train including a first compressor, an expander, and a shaft operatively coupled to both the first compressor and the expander such that the expander rotates the shaft which drives the first compressor. The syngas is compressed by the first compressor to define the compressed syngas. The expander expands the first stream of gas with the second stream of gas to produce the feed gas and to extract energy from the first and second streams of gas to drive the expander to rotate the shaft.

In at least one other embodiment of the present invention, a system for heating a fluid catalytic cracking unit having a regenerator and a reactor for overall reduction of carbon dioxide reduction is provided. The system comprises a compressor for compressing syngas at an inlet pressure to a predetermined high pressure to define compressed syngas. The syngas comprises $CO_2$, CO, $H_2O$, $H_2S$ and COS. In fluid communication with the compressor is a separator unit. The separator unit is configured to separate a first stream of gas comprising $CO_2$ from the compressed syngas. An expander is in fluid communication with the separator unit. The expander is configured for expanding the first stream of gas with a second stream of gas comprising $O_2$ to define a feed gas. At gasification conditions is the regenerator for regenerating coke heavy spent catalyst from the reactor. The regenerator is configured for receiving the feed gas to burn coke from the coke heavy spent catalyst, producing the syngas and heat for operating the reactor at reaction temperatures.

Further objects, features and advantages of the invention will become apparent from consideration from the following description and the appended claims when taken in connection with the accompanying drawings.

BRIEF DESCRIPTION OF THE DRAWINGS

FIG. 1a is a schematic diagram of a fluid catalytic cracking unit;

FIG. 1b is a schematic diagram of a reactor and a regenerator of the fluid catalytic cracking unit of FIG. 1a;

FIG. 1d is a schematic diagram of a fluid catalytic cracking unit in accordance with at least another embodiment of the present invention.

DETAILED DESCRIPTION OF THE INVENTION

Figure 1C:
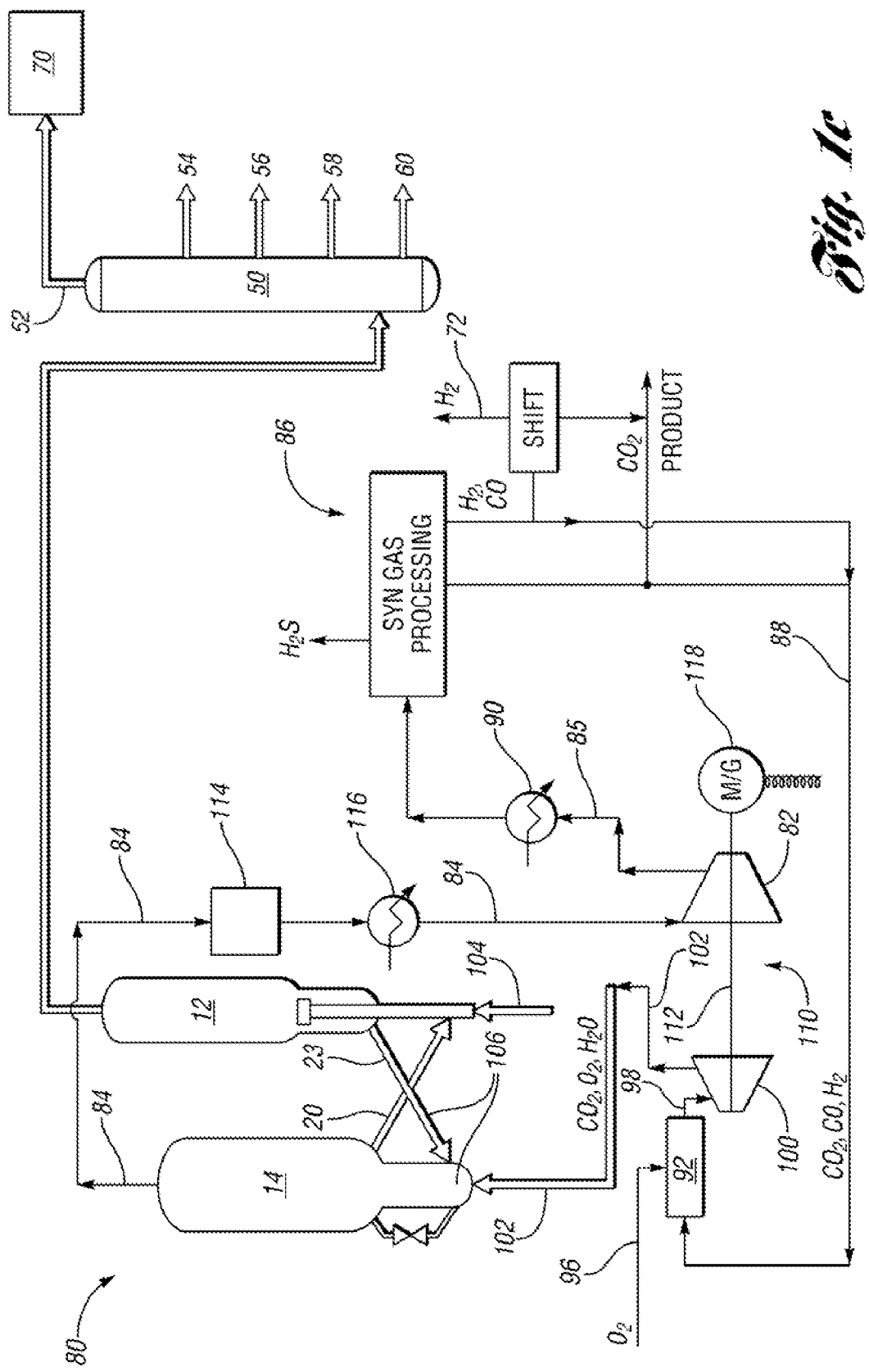
FIG. 1c is a schematic diagram of a fluid catalytic cracking unit in accordance with at least one embodiment of the present invention.
Figure 15:
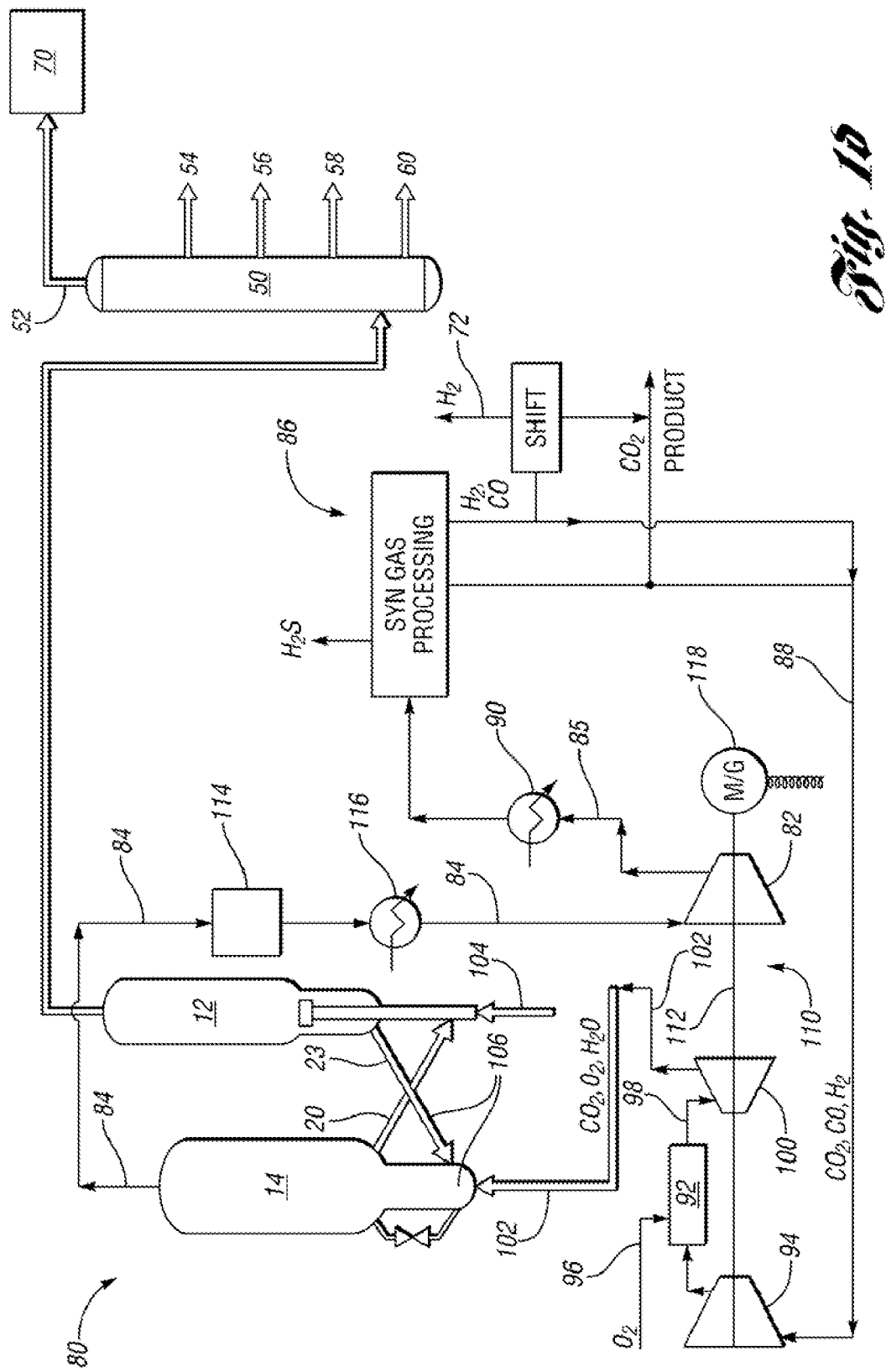

Detailed embodiments of the present invention are disclosed herein. It is understood however, that the disclosed embodiments are merely exemplary of the invention that may be embodied in various and alternative forms. The figures are not necessarily to scale; some figures may be configured to show the details of a particular component. Therefore, specific structural and functional details disclosed herein are not interpreted as limiting but merely as a representative basis with the claims and for teaching one skilled in the art to practice the present invention.

Examples of the present invention seek to overcome some of the concerns associated with heating a fluid catalytic cracking unit while reducing overall $CO_2$ emissions from the refinery. A conventional fluid catalytic cracking unit burns coke from the spent catalyst by feeding gas comprising air and/or $O_2$ into the regenerator, producing flue gas, which contains $CO_2$ but is typically rich in nitrogen ($N_2$). However, by introducing a feed gas comprising $O_2$ with $CO_2$ and/or $H_2O$ into the regenerator, a synthesis gas (syngas) may be produced. Specifically, the $CO_2$ and the $O_2$ in the feed gas may react with the carbon-hydrogen based coke to produce $CO_2$, $CO$, $H_2O$ and $H_2$ by a "dry" gasification process and the $H_2O$ and the $O_2$ in the feed gas may react with the coke to produce $CO_2$, $CO$ and $H_2$ by a "wet" gasification process.

The $H_2$ in the syngas may be used as a raw material source for other operations within the refinery which may reduce the need for an additional fuel source, such as a hydrogen furnace. Additionally, the $CO_2$ in the syngas may be more easily sequestered than $CO_2$ in $N_2$ rich flue gas, such as for example, by limestone structures or any other suitable means known to those skilled in the art. By reducing or eliminating the need for a hydrogen furnace and by sequestering the $CO_2$ for recycling as a feed gas for operating the regenerator at gasification conditions, overall $CO_2$ emission may be reduced from the refinery.

However, burning coke on spent catalyst under gasification conditions is not as exothermic a process as burning coke in air and/or $O_2$. Moreover, the coke fuel is typically limited because only about 4%, for example, of a VGO feedstock fed to the reactor is converted to coke which is deposited upon the catalyst. Accordingly, less heat is generated under gasification conditions and since the heat generated in the regenerator is recovered by the reactor for the cracking reaction, the reactor may be at a lower temperature which could adversely affect cracking of the hydrocarbon feedstock. Applicant has discovered that by introducing a high Conradson carbon feedstock into the reactor, a "coke heavy" spent catalyst may be generated which provides more fuel to the regenerator and thus, more heat is produced to support the operation of the reactor at reaction temperatures. In one example, a vacuum residue feedstock is fed into the reactor producing the coke heavy spent catalyst. In an alternative example, a solvent deasphalter pitch (SDA pitch) is fed into the reactor to produce the coke heavy spent catalyst. Vacuum residue is defined herein as a low value hydrocarbon fraction of crude which is rich in asphaltenes and heavy Conradson carbon e.g. 18 to 30 or more. SDA pitch is defined herein as being that portion of the vacuum residue that is insoluble in a paraffinic solvent. SDA pitch contains the majority of the vacuum residue's asphaltenes and Conradson carbon and is therefore very rich in carbon. Coke heavy spent catalyst is defined herein as being catalyst having at least about 12 percent by weight of the crude that is fed to the reactor being converted to coke which is deposited onto the catalyst. When the coke heavy spent catalyst is regenerated in the regenerator, the significantly higher coke content provides additional fuel. The additional fuel/coke generates more heat when it is burned and thus, allows the reactor to operate at reaction temperatures for cracking the feedstock.

Referring now to the drawings, FIG. 1a illustrates a fluid catalytic cracking (FCC) unit and separation system 10. As shown, the FCC unit 10 comprises a reactor 12 that is configured to receive crude or a hydrocarbon feedstock 30 (fresh feed) and a regenerator 14 in fluid communication with the reactor 12 to receive spent catalyst. The reactor 12 cracks the feedstock 30 therein to an effluent containing hydrocarbons ranging from methane through relatively high boiling point materials along with $H_2$ and $H_2S$. During the cracking reaction, a carbonaceous by-product is deposited on the circulating catalyst. This material, termed "coke," is continuously burned off the spent catalyst in the regenerator 14 as will be mentioned below.

The FCC unit 10 comprises the regenerator 14 for regenerating spent catalyst from the reactor 12. The regenerator 14 is configured to receive a feed gas 22 from an outside source and spent catalyst from the reactor 12. From the reactor 12, the spent catalyst has coke deposited thereon, reducing the activity of the catalyst. The regenerator 14 receives the feed gas 22 to burn the coke off the spent catalyst, thereby producing a flue gas 26 that exits a flue gas line 28 to a flue-gas system. The flue gas 26 may comprise $CO$, $CO_2$, $H_2O$ (steam), $SO_x$ and $N_2$, but it is typically very rich in $N_2$. The regenerator 14 is configured to rejuvenate or reactivate the spent catalyst by burning the deposited coke off the spent catalyst with the feed gas 22.

The regenerator 14 reactivates the catalyst so that, when returned to the reactor 12, the catalyst is in optimum condition to perform its cracking function. The regenerator 14 serves to gasify the coke from the catalyst particles and, at the same time, to impart sensible heat to the circulating catalyst. The energy carried by the hot regenerator catalyst is used to satisfy the thermal requirements for the reactor 12 of the FCC unit 10.

It is to be noted that the FCC unit 10 may have a number of optional units associated with the flue-gas system. In one embodiment, the flue gas 26 may comprise catalyst fines, $N_2$ from air used for combustion, products of coke combustions (e.g., oxides of carbon, sulfur, nitrogen, and water vapor), and trace quantities of other compounds. The flue gas 26 exits the regenerator 14 at a temperature of approximately 1325 degrees Fahrenheit (F), but may be as high as 1400 degrees F. or as low as 1200 degrees F., and at pressures of between about 20 and 50 pounds per square inch gauge (psig). The thermal and kinetic energy of the flue gas 26 can be converted to steam or used to drive a turbo-expander generator system for electrical power generation. Unconverted CO in the flue gas 26 can be combusted to $CO_2$ in a CO boiler with production of high-pressure steam. Catalyst fines may be removed by a solid removal unit, such as for example, an electrostatic precipitator. $CO_2$ from the regenerator and/or CO boiler is released to the atmosphere.

Referring now to FIGS. 1a to 1b, from the regenerator 14, hot regenerated catalyst is fed back to the reactor 12 via reactivated catalyst return line 20 and vaporizes the hydrocarbon feedstock 30 to define resultant vapors. The resultant vapors carry the catalyst upward through a riser 16 of the reactor 12 with a minimum of back mixing. At the top of the riser 16, desired cracking reactions have been completed and the catalyst is quickly separated from the hydrocarbon vapors to minimize secondary reactions. The catalyst-hydrocarbon mixture from the riser 16 is discharged into the reactor 12 vessel through a separation device 18, e.g., a riser termination device, achieving a substantial degree of catalyst-gas separation, e.g., at least 90 weight percent product vapor separation from catalyst. A final separation of catalyst and product vapor may be accomplished by cyclone separation.

The reactor effluent is directed to a main fractionator or fractionation column 50 of the unit 10 for resolution into gaseous light olefin co-products, FCC gasoline, and cycle stocks. The spent catalyst drops from within the reactor 12 vessel into a stripping section 24 thereof, where a countercurrent flow of steam removes interstitial and some adsorbed hydrocarbon vapors, defining stripped spent catalyst. Stripped spent catalyst descends through a first standpipe 23 and into the regenerator 14.

To maintain the activity of the working-catalyst inventory at a desired level and to make-up for any catalyst lost from the system with the flue gas 26, fresh catalyst may be introduced into the circulating-catalyst system by any suitable manner. For example, this may be accomplished by way of a catalyst storage hopper (not shown). Moreover, an additional storage hopper (not shown) may be used to hold spent catalyst withdrawn from the circulating system as necessary to maintain the desired working activity and to hold all catalyst inventory when the FCC unit 10 is shut down for maintenance and repairs.

As shown in FIGS. 1a and 1b, in the operation of the FCC unit 10, fresh feedstock 30 and (depending on product-distribution objectives) recycled cycle oils are introduced into the bottom of the riser 16 together with a controlled amount of regenerated catalyst. The charge may be preheated, either by heat exchange or, for some applications, by means of a fired heater.

Feedstocks 30 for the FCC process include mixtures of hydrocarbons of various types, including relatively small molecules such as found in gasoline to large molecules of 60 or more carbon atoms. The feedstock 30 may include a relatively small content of contaminant materials such as organic sulfur, nitrogen compounds, and organometallic compounds. It is to be noted that the relative proportions of all such materials will vary with the geographic origin of the crude and the particular boiling range of the FCC feedstock 30. However, the feedstocks 30 may be ranked in terms of their "crackabilities," or the ease with which they can be converted in an FCC unit. Crackability may be defined by a function of the relative proportions of paraffinic, naphthenic, and aromatic species in the feed.

The FCC unit 10 further includes a main-fractionation column 50 through which the reactor effluent is separated into various products. The main-fractionation comprises an overhead line 52, a first side cut line 54, a second side line 56, a third side cut line 58, and a bottom line 60. As shown, the overhead line 52 includes gasoline and lighter material, the first side cut line 54 includes naphtha, the second side cut line 56 includes light cycle oil, the third side cut line 58 includes heavy cycle oil, and the bottom line 60 includes slurry oil. The lines may include other products without falling beyond the scope or spirit of the present invention.

Reactor-product vapors are directed to the main fractionator 50 at which gasoline and gaseous olefin-rich co-products are taken overhead and routed to a gas-concentration unit 70. At the main-fractionator 50, light-cycle oil is recovered as a side cut with the net yield of this material being stripped for removal of light ends and sent to storage. Net column bottoms are yielded as slurry or clarified oil. Because of the high efficiency of the catalyst-hydrocarbon separation system utilized in the reactor design, catalyst carry-over to the fractionator 50 is minimized and it is not necessary to clarify the net heavy product yielded from the bottom of the fractionator 50 unless the material is to be used in some specific application requiring low solids content such as the production of carbon black. In some instances, heavy material can be recycled to the reactor riser 16.

Maximum usage is made of the heat available at the main column 50. Typically, light-cycle and heavy-cycle oils are utilized in the gas-concentration section 70 for heat-exchange purposes, and steam is generated by circulating main-column bottoms stream.

The gas-concentration column 70 is in fluid communication with overhead line of the main-fractionation column 50. From the overhead line 52, the gas-concentration column 50 receives unstable gasoline and lighter products that are separated therethrough into fuel gas for alkylation, polymerization, and debutanized gasoline.

The gas-concentration section 70 may be one or an assembly of absorbers and fractionators that separate the main-column overhead into gasoline and other desired light products. Olefinic gases from other processes such as coking may be also sent to the FCC gas-concentration section. The gas-concentration unit may have one or a plurality of columns. For example, the gas-concentration unit may be a "four-column" gas-concentration plant comprising a primary absorber, a secondary absorber, a stripper, and a debutanizer.

Referring now to FIG. 1c, at least one embodiment of a system 80 for heating a fluid catalytic cracking unit that has a regenerator 14 and a reactor 12 for overall carbon dioxide reduction is provided. The system 80 comprises a compressor 82 for compressing syngas 84 at an inlet pressure to a predetermined high pressure to define a compressed syngas 85. The syngas 84 is comprised of $CO_2$, CO, $H_2O$ and COS and may further include $H_2$ and $H_2S$. In one example, the compressor 82 has a compression ratio between about 5:1 and 10:1 and preferably has a compression ratio of about 7:1. The inlet pressure may be, for example, between about 25 and 35 psig. The compressor 82 preferably compresses the syngas 84 to a pressure between about 150 and 500 psig.

A separator unit 86 is in fluid communication with the compressor 82. The separator unit 86 is configured to separate at least $CO_2$ from the compressed syngas 85 to produce a first stream of gas 88 comprising $CO_2$. In one example, the separator unit uses a wet gas scrubbing process such as amine absorption, Rectisol™, or Selexol™, which is used to remove and/or separate $H_2S$, COS, and $CO_2$ from the compressed syngas 85 to produce the first stream of gas 88. Other suitable forms of separating known to those skilled in the art may also be used. The syngas gas 85 may also contain CO and $H_2$, which can be mixed with steam and sent to a water-gas shift reactor to convert CO to $CO_2$, thus producing additional $H_2$. The $H_2$ may be further separated from the $CO_2$ via a process known as pressure swing adsorption. In this scenario, the separated $H_2$ 72 may minimize the need to burn hydrocarbon fuels elsewhere in the plant for use by another system, thereby reducing overall $CO_2$ emissions from the refinery. For example, the separated $H_2$ 72 may be used by another system by being burned as a fuel or used to hydro-treat or hydrocrack other hydrocarbons.

Heat recovery and cooling by a cooling unit 90 may be performed subsequent to compressing the syngas 84 by the compressor 82 but prior to the compressed syngas 85 being processed by the separation unit 86. In one example, the cooling unit 90 cools the compressed syngas 85 having a temperature between about 600 and 800 degrees F. to between about 300 and 500 degrees F.

In one embodiment, the first stream of gas 88, which may contain a portion of the separated CO plus $H_2$ that is in excess of the amount required for refinery $H_2$ production, is supplied to an expander 100 which is in fluid communication with the separator unit 86. A second stream of gas 96 comprising $O_2$ may also be supplied to the expander 100. Alternatively and as illustrated in FIG. 1c, the first stream of gas 88 may initially be supplied to a combustion zone 92 or combustor with the second stream of gas 96. In this scenario, the combustion zone 92 is in direct fluid communication with the separator unit 86. In still yet another example and as illustrated in FIG. 1d, the first stream of gas 88 may be supplied initially to a second compressor 94 which is in fluid communication with both the separator unit 86 and the combustion zone 92. The second compressor 94 further compresses the first stream of gas 88 prior to the combustion zone 92 receiving the gas 88.

The combustion zone 92 is configured for combusting the second stream of gas 96 comprising $O_2$ with the first stream of gas 88 to a predetermined high temperature to produce heated gas 98. If the first stream of gas 88 contains any $H_2$ and/or CO, preferably the first and second streams of gas are combusted in the combustion zone 92 prior to being received by the expander 100. In one example, the predetermined high temperature is between about 1800 and 2100 degrees F. The combustion zone combusts any $H_2$ and/or CO from the first stream of gas 88 with the $O_2$ from the second stream of gas 96 to produce the heated gas 98 comprising $CO_2$ and/or $H_2O$. Moreover, some of the $O_2$ from the second stream of gas 96 will preferably remain un-reacted, especially if the second stream of gas is stoichiometrically in excess to the first stream of gas 88. In this scenario, the excess $O_2$ forms a portion of the heated gas 98.

The expander 100 may be in direct fluid communication with the separator unit 86. Alternatively, the expander 100 may be in direct fluid communication with the combustion zone 92 and be in indirect fluid communication with the separator unit 86. The expander 100 is configured for expanding the first and second streams of gas 88 and 96 to a predetermined low pressure to define a feed gas 102. If the first and second streams of gas 88 and 96 are initially directed to the combustion zone 92, then the expander 100 expands these streams of gas 88 and 96 in the form of the heated gas 98. In one embodiment, the expander 100 is a 10 to 15 stage turbo-expander. The feed gas 102 has a pressure between about 30 and 70 psig and preferably between about 30 and 40 psig and may have a temperature between about 1200 and 1600 degrees F. when the combustion zone 92 is used. Alternatively, if the first and second streams of gas 88 and 96 are not combusted, the feed gas 102 may have a temperature of about 100 degrees F.

In at least one embodiment, the reactor 12 is configured for receiving a low value crude feed 104 rich in asphaltenes and Conradson carbon. In one example, the low value crude feed 104 is substantially vacuum residue. In another example, the low value crude feed 104 is substantially SDA pitch.

The reactor 12 cracks the low value crude feed 104 with catalyst, producing coke heavy spent catalyst 106 which is advanced to the regenerator 14 via the first standpipe 23. Preferably at least about, with increasing preference in the order given, 12%, 14%, 16%, 18% and 20% by weight of the low value crude feed 104 is converted to coke which is deposited onto the catalyst to form the coke heavy spent catalyst 106.

The regenerator 14 receives the feed gas 102, which in one example comprises $O_2$ and $CO_2$. The feed gas 102 may further include $H_2O$. The regenerator 14 is operating at gasification conditions, burning coke from the coke heavy spent catalyst 106 with the feed gas 102. The additional coke deposited on the coke heavy spent catalyst 106 fuels the burning process and increases the combustion energy within the regenerator 14, enhancing the gasification process and producing syngas and heat. The syngas is preferably at a temperature between about 1200 and 1850 degrees F. and may also be rich in CO and $H_2$.

Referring to FIGS. 1c and 1d, the compressor 82, the combustion zone 92 and the expander 100 may be part of a turbo-expander train 110. The turbo-expander train 110 includes a shaft 112 operably coupled to both the expander 100 and the compressor 82 such that the expander 100 rotates the shaft 112 which drives the compressor 82. The expander 100, acting as a turbine engine, extracts energy from the heated gas 98 by expanding the heated gas 98. The expander 100 converts the extracted energy to rotational energy which rotates the shaft 112. In another example, the turbo-expander train 110 may further include a second compressor 94 which is operably coupled to the shaft 112 and is also driven by the expander 100.

The system 80 may include a solid removal unit 114 and a cooling unit 116. The cooling unit 116 is in fluid communication with the solid removal unit 114 and the compressor 82. The solid removal unit 114 is in fluid communication with the regenerator 14 and may be used to remove catalyst fines from the syngas 84 prior to the syngas 84 being received by the cooling unit 116 and/or the compressor 82. In one example, the cooling unit 116 cools the syngas 84 from a temperature between about 1200 and 1850 degrees F., but preferably between about 1200 and 1400 degrees F., to a temperature between about 300 and 600 degrees F.

In at least one other embodiment, the turbo-expander train 110 further includes a motor generator 118. The motor generator 118 is operably coupled to the shaft 112 and is driven by the expander 100. The motor generator 118 produces electrical power when the shaft 112 is rotated. The electrical power may be used for various processes within the plant. In one example, this electrical power minimizes the need to burn fuel elsewhere in the plant for power generation, thereby reducing overall $CO_2$ emissions from the refinery.

Figure 2:
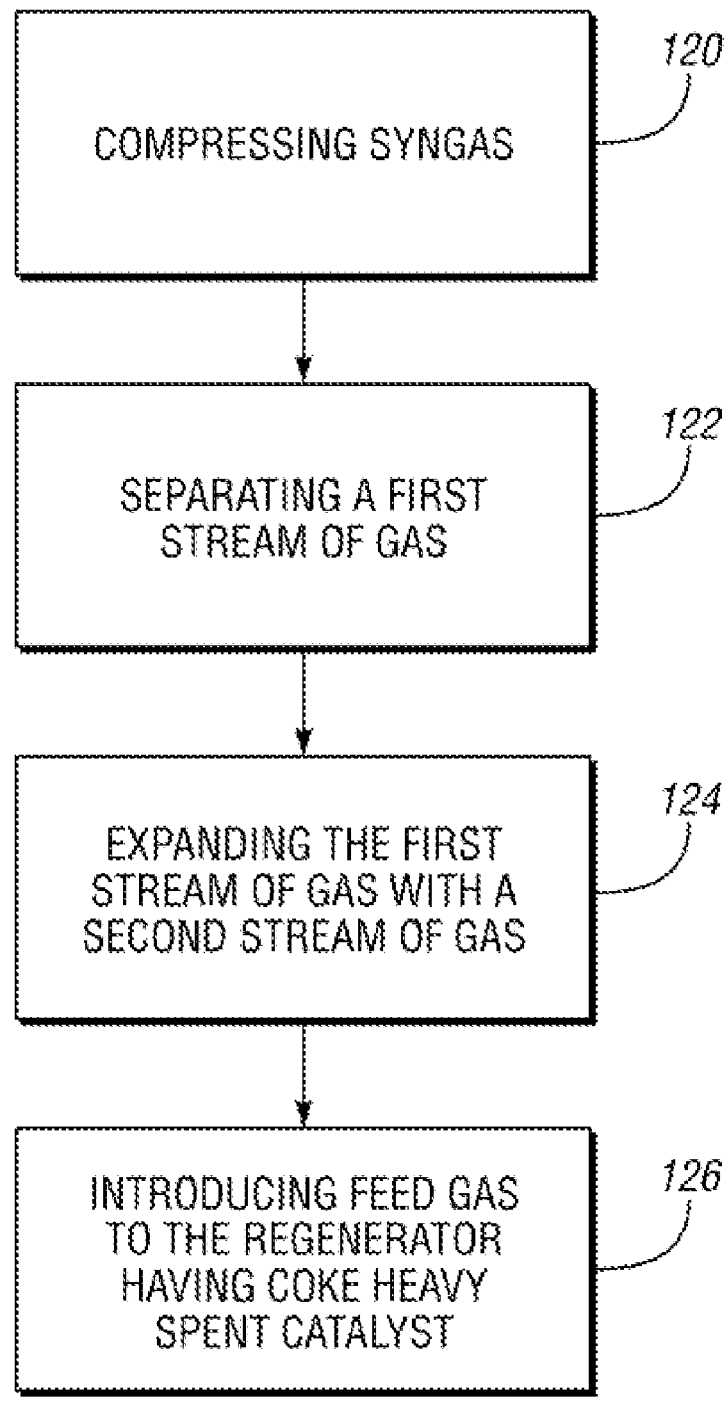
FIG. 2 is a flow chart of an example of a method of heating a fluid catalytic cracking in accordance with the present invention.

Referring to FIG. 2, at least one embodiment for a method of heating a fluid catalytic cracking unit having a regenerator and a reactor for overall carbon dioxide reduction is provided. The method comprises compressing syngas 120 at an inlet pressure to a predetermined high pressure to define compressed syngas. In one example, the inlet pressure is between about 25 and 35 psig and the predetermined high pressure is between about 150 and 500 psig.

$CO_2$ is separated from the compressed syngas to provide a first stream of gas 122 comprising $CO_2$. In one example, the first stream of gas is combusted with a second stream of gas comprising $O_2$ to produce heated gas. The heated gas may have a temperature between about 1800 and 2100 degrees F.

The first and second streams of gas may be expanded 126 to a low pressure to define a feed gas. In the example where the first and second streams of gas are combusted, the expander expands the first and second streams of gas in the form of the heated gas.

The feed gas is introduced to the regenerator 128. The regenerator is at gasification conditions to burn coke from coke heavy spent catalyst, which was advanced from the reactor. Burning of the coke produces the syngas and heat for operating the reactor at reaction temperatures. In one example, the feed gas has a temperature between about 1200 and 1600 degrees F. and the syngas produced within the regenerator has a temperature between 1200 and 1850 degrees F. and preferably between about 1200 and 1400 degrees F.

In at least one other embodiment, the method further includes removing catalyst fines and cooling the syngas to a temperature between 400 and 600 degrees F. prior to the step of compressing. The compressed syngas may also be cooled to a temperature between 300 and 500° F.

The following example (displayed in Tables 1 and 2) further illustrates embodiments of the invention. A comparison is made between: (1) a FCC unit with a reactor and a regenerator operating under combustion conditions (i.e. using air as the feed gas to the regenerator) and (2) a FCC unit with a reactor and a regenerator operating under gasification conditions (i.e. using an artificially created feed gas comprising $CO_2$ and $O_2$). Under normal FCC operations, the heat produced in the regenerator under combustion and gasification conditions ("total heat available") is transferred to operate the reactor ("total heat required").

In Table 1, this example calculates the total heat required by the reactor when a feedstock enters the riser at 450° F. and the reactor product exits at 980° F. The total heat available in the regenerator is calculated with the regenerator operating at 1275° F. and circulating 7 lbs of catalyst per pound of FCC feedstock. Assuming the coke has an approximate formula of $C_{22}H_{11}$ and contains an indistinguishable amount of sulfur, the example requires 13.75 lbs of air (under combustion conditions) to burn each pound of coke. Based on these operating conditions and assumptions, the reactor has a total heat requirement of 620 Btu per lb of feedstock. The regenerator, under combustion conditions, has a total heat available of 13,332 Btu per lb of coke. Therefore, the minimum amount of coke on catalyst to supply the required heat to the reactor is 0.047 lb coke/lb feedstock [(620 Btu/lb of feedstock)/(13,332 Btu/lb of coke)] or about 4.7%.

TABLE 1

| FCC Unit Operating Under Combustion Conditions | | | |
|---|---|---|---|
| Reactor | | Regenerator | |
| Source | Btu/lb of feed | Source | Btu/lb of coke |
| ΔH Feed | 475 | ΔH Air/Flue Gas | −3,452 |
| ΔH Reaction | 132 | ΔH Combustion | 16,775 |

TABLE 1-continued

| FCC Unit Operating Under Combustion Conditions | | | |
|---|---|---|---|
| Reactor | | Regenerator | |
| Source | Btu/lb of feed | Source | Btu/lb of coke |
| ΔH Steam | 10 | Heat Loss | −255 |
| Heat Loss | 3 | Total Heat | 13,332 |
| Total Heat Required | 620 | Available | |

Coke = Total Heat Required/Total Heat Available = 620/13332 * 100% = 4.7%

In Table 2, this example shifts from combustion conditions to gasification conditions in the regenerator. If reactor conditions remain the same as Table 1 (i.e. feedstock entering at 450° F. and product exiting at 980° F.), then the total heat required by the reactor will remain the same (620 Btu per lb of feedstock). Additionally, the regenerator will have to supply catalyst to the reactor at the same rate and temperature. Under gasification conditions, the total heat available can vary depending on the concentration of $O_2$ and $CO_2$ in the feed gas. In this example, assume the following reaction represents the heat of combustion based on one ratio of $O_2$ to $CO_2$ ($C_{22}H_{11} + 8\frac{1}{2} O_2 + 5 CO_2 \rightarrow 27 CO + 5\frac{1}{2} H_2$). This reaction produces approximately 2,711 Btu per lb of coke. Assuming that the incoming feed gas must be heated from 100° F. to 1275° F., the heat requirement is approximately 571 Btu per lb of coke ((1.8 lb gas per lb coke*0.27 Btu per lb ° F.*(1275° F.-100° F.)). The regenerator, under gasification conditions, has a total heat available of 1,885 Btu per lb of coke. In this example, the minimum amount of coke on catalyst to supply the required heat to the reactor is 0.329 lb coke/lb feedstock [(620 Btu/lb of feedstock)/(1,885 Btu/lb of coke)] or about 32.9%. As discussed, this increased coke level is not typically achieved during normal operations of the FCC unit e.g. a VGO feedstock produces only about 4% by weight of coke/feedstock. However, by introducing a high Conradson carbon feedstock into the reactor a coke heavy spent catalyst can be produced, which when burned within the regenerator may produce enough heat to satisfy the energy requirement of the reactor. In one example, the coke heavy spent catalyst burns to produce at least about a 600 BTU/lb of the feedstock for operating the reactor at reaction temperatures.

TABLE 2

| FCC Unit Operating Under Gasification Conditions | | | |
|---|---|---|---|
| Reactor | | Regenerator | |
| Source | Btu/lb of feed | Source | Btu/lb of coke |
| ΔH Feed | 475 | ΔH Feed Gas/Syngas | −571 |
| ΔH Reaction | 132 | ΔH Combustion | 2,711 |
| ΔH Steam | 10 | Heat Loss | −255 |
| Heat Loss | 3 | Total Heat Available | 1,885 |
| Total Heat Required | 620 | | |

Coke = Total Heat Required/Total Heat Available = 620/1885 * 100% = 32.9%

As a person skilled in the art will readily appreciate, the above description is meant as an illustration of the implementation of the principles of this invention. This description is not intended to limit the scope or application of the invention in that the invention is susceptible to modification, variation and change without departing from the spirit of this invention, as defined in the following claims.

What is claimed is:

1. A method of heating a fluid catalytic cracking unit having a regenerator and a reactor for overall carbon dioxide reduction, the method comprising:
    compressing syngas comprising $CO_2$, CO, $H_2O$, $H_2S$ and COS at an inlet pressure to a predetermined high pressure to define compressed syngas;
    separating a first stream of gas comprising $CO_2$ from the compressed syngas;
    expanding the first stream of gas with a second stream of gas comprising $O_2$ to a predetermined low pressure to define a feed gas; and
    introducing the feed gas to the regenerator having coke heavy spent catalyst from the reactor, the regenerator at gasification conditions to burn coke from the coke heavy spent catalyst, producing the syngas and heat for operating the reactor at reaction temperatures.

2. The method according to claim 1 wherein the reactor is configured for receiving feedstock that reacts with catalyst to produce the coke heavy spent catalyst and the heat for operating the reactor at reaction temperatures is at least about 600 BTU per pound of the feedstock.

3. The method according to claim 2 wherein the feedstock comprises vacuum residue and at least about 12 percent by weight of the vacuum residue is converted to the coke which is deposited onto the catalyst to produce the coke heavy spent catalyst.

4. The method according to claim 2 wherein the feedstock comprises solvent deasphalter pitch and at least about 12 percent by weight of the solvent deasphalter pitch is converted to the coke which is deposited onto the catalyst to produce the coke heavy spent catalyst.

5. The method according to claim 1 wherein the syngas further comprises $H_2$ and the first stream of gas further comprises at least one of CO and $H_2$ and the method further comprises combusting the first stream of gas with the second stream of gas to a predetermined high temperature to produce a heated gas, and the step of expanding includes expanding the heated gas to define the feed gas.

6. The method according to claim 5 wherein the predetermined high temperature is between about 1800 and 2100 degrees Fahrenheit (F.).

7. The method according to claim 5 further comprising separating at least a portion of the $H_2$ from the compressed syngas, the portion of the $H_2$ being used for another system, reducing overall $CO_2$ emissions.

8. The method according to claim 1 wherein the predetermined high pressure is between about 150 and 500 psig.

9. The method according to claim 1 wherein the predetermined low pressure is between about 30 and 70 psig.

10. The method according to claim 1 wherein the feed gas has a temperature between about 1200 and 1600 degrees Fahrenheit (F.).

11. The method according to claim 1 wherein the syngas produced at the reactor has a temperature between about 1200 and 1850 degrees Fahrenheit (F.).

12. The method according to claim 1 wherein the feed gas comprises $CO_2$, $O_2$ and $H_2O$.

13. The method according to claim 1 further comprising removing catalyst fines and cooling the syngas to a temperature between about 300 and 600 degrees Fahrenheit (F.) prior to the step of compressing.

14. The method according to claim 1 further comprising cooling the compressed syngas to a temperature between about 300 and 500 degrees Fahrenheit (F.).

15. A method of heating a fluid catalytic cracking unit having a regenerator and a reactor for overall carbon dioxide reduction, the method comprising:
    providing a turbo-expander train including a first compressor, an expander, and a shaft operatively coupled to both the expander and the first compressor such that the expander rotates the shaft which drives the first compressor;
    compressing syngas comprising $CO_2$, CO, $H_2O$, $H_2S$ and COS at an inlet pressure with the first compressor to a predetermined high pressure to define compressed syngas;
    separating a first stream of gas comprising $CO_2$ from the compressed syngas;
    expanding the first stream of gas with a second stream of gas comprising $O_2$ by the expander to a predetermined low pressure, producing a feed gas and extracting energy from the first and second streams of gas to drive the expander to rotate the shaft; and
    introducing the feed gas to the regenerator having coke heavy spent catalyst from the reactor, the regenerator at gasification conditions to burn coke from the coke heavy spent catalyst, producing the syngas and heat for operating the reactor at reaction temperatures.

16. The method according to claim 15 wherein the turbo-expander train further includes a combustion zone in fluid communication with the expander and the first stream of gas further comprises at least one of CO and $H_2$ and the method further comprises combusting the first and second streams of gas by the combustion zone to a predetermined high temperature to produce heated gas, and the step of expanding includes expanding the heated gas, producing the feed gas and extracting energy from the heated gas by the expander to drive the expander to rotate the shaft.

17. The method according to claim 16 wherein the turbo-expander train further includes a second compressor in fluid communication with the combustion zone and operatively coupled to the shaft such that rotation of the shaft drives the second compressor, and the method further includes compressing the first stream of gas prior to the step of combusting.

18. The method according to claim 15 wherein the turbo-expander train further includes a motor generator operatively coupled to the shaft such that rotation of the shaft drives the motor generator, and the method further comprises driving the motor generator producing electrical energy.

19. A system for heating a fluid catalytic cracking unit having a regenerator and a reactor for overall carbon dioxide reduction, the system comprising:
    a compressor for compressing syngas comprising $CO_2$, CO, $H_2O$, $H_2S$ and COS at an inlet pressure to a predetermined high pressure to define compressed syngas;
    a separator unit in fluid communication with the compressor and configured to separate a first stream of gas comprising $CO_2$ from the compressed syngas;
    an expander in fluid communication with the separator unit and configured for expanding the first stream of gas with a second stream of gas comprising $O_2$ to a predetermined low pressure to define a feed gas; and
    the regenerator at gasification conditions for regenerating coke heavy spent catalyst from the reactor and configured for receiving the feed gas to burn coke from the coke heavy spent catalyst, producing the syngas and heat for operating the reactor at reaction temperatures.

20. The system according to claim 19 wherein the compressor and the expander are part of a turbo-expander train, the turbo-expander train including a combustion zone in fluid communication with the separator unit and the expander, and a shaft operatively coupled to both the expander and the compressor such that the expander rotates the shaft which drives the first compressor, the combustion zone configured for combusting the first and second streams of gas to a predetermined high temperature to produce heated gas, and the expander configured for extracting energy from the heated gas, rotating the shaft.

21. The system according to claim 20 wherein the predetermined high temperature is between about 1800 and 2100 degrees Fahrenheit (F.) and the feed gas has a temperature between about 1200 and 1600 degrees Fahrenheit (F.).

22. The system according to claim 19 further comprising the reactor configured for receiving feedstock, the feedstock comprising at least one of vacuum residue and solvent deasphalter pitch to produce the coke heavy spent catalyst.

23. The system according to claim 19 wherein the predetermined high pressure is between about 150 and 500 psig and the predetermined low pressure is between about 30 and 70 psig.

24. The system according to claim 19 wherein the syngas further comprises $H_2$ and the separator unit is further configured to separate at least a portion of the $H_2$ from the compressed syngas, the portion of the $H_2$ being used for another system, reducing overall $CO_2$ emissions.

25. The system according to claim 19 wherein the reactor is configured for receiving feedstock that reacts with catalyst to produce the coke heavy spent catalyst and the heat for operating the reactor at reaction temperatures is at least about 600 BTU per pound of feedstock.

* * * * *